(12) United States Patent
Coronado

(10) Patent No.: US 9,446,488 B2
(45) Date of Patent: Sep. 20, 2016

(54) SELF-LOCKING MOLDED-IN BLIND INSERTS

(71) Applicant: THE BOEING COMPANY, Chicago, IL (US)

(72) Inventor: Peter Apolonio Coronado, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 58 days.

(21) Appl. No.: 14/284,023

(22) Filed: May 21, 2014

(65) Prior Publication Data

US 2015/0337886 A1 Nov. 26, 2015

(51) Int. Cl.
| F16B 39/02 | (2006.01) |
|---|---|
| B23P 19/04 | (2006.01) |
| B29C 70/68 | (2006.01) |
| F16B 5/01 | (2006.01) |
| F16B 37/12 | (2006.01) |
| B29L 1/00 | (2006.01) |

(52) U.S. Cl.
CPC .............. *B23P 19/04* (2013.01); *B29C 70/682* (2013.01); *F16B 5/01* (2013.01); *F16B 37/122* (2013.01); *B29L 2001/005* (2013.01); *Y10T 29/4995* (2015.01)

(58) Field of Classification Search
CPC ...... F16B 5/01; F16B 5/0208; F16B 13/141; F16B 39/02; F16B 39/021
USPC .................................. 411/82, 82.1, 373, 376
See application file for complete search history.

(56) References Cited

U.S. PATENT DOCUMENTS

| | | | | | |
|---|---|---|---|---|---|
| 3,305,996 | A * | 2/1967 | Shapiro | ..................... | F16B 5/01 428/116 |
| 3,313,078 | A * | 4/1967 | Rohe | ......................... | F16B 5/01 29/455.1 |
| 3,339,609 | A * | 9/1967 | Cushman | .................. | B64C 1/12 249/93 |
| 3,355,850 | A * | 12/1967 | Rohe | ....................... | E04C 2/365 411/34 |
| 3,504,723 | A * | 4/1970 | Cushman | .................. | F16B 5/01 29/513 |
| 3,884,006 | A * | 5/1975 | Dietlein | ................ | B23P 19/062 411/360 |
| 4,812,193 | A * | 3/1989 | Gauron | ................... | B29C 65/42 156/293 |
| 4,981,735 | A * | 1/1991 | Rickson | .................... | F16B 5/01 156/92 |
| 5,093,957 | A * | 3/1992 | Do | .......................... | E04C 2/365 16/2.1 |
| 5,378,099 | A * | 1/1995 | Gauron | ................... | B29C 70/68 411/108 |
| 5,632,582 | A * | 5/1997 | Gauron | ..................... | F16B 5/01 411/108 |
| 5,879,115 | A * | 3/1999 | Medal | ..................... | B29C 65/08 156/272.2 |
| 6,488,460 | B1 * | 12/2002 | Smith | ....................... | F16B 5/01 411/339 |
| 7,195,436 | B1 | 3/2007 | Stephen | | |
| 7,641,427 | B2 * | 1/2010 | Zhang | ....................... | F16B 5/01 411/21 |
| 7,802,953 | B2 * | 9/2010 | Stephen | ................ | F16B 5/0208 411/246 |
| 8,297,169 | B2 * | 10/2012 | Kunda | .................... | F16B 5/025 411/108 |

\* cited by examiner

*Primary Examiner* — Robert A Delisle
(74) *Attorney, Agent, or Firm* — Patterson+Sheridan LLP

(57) ABSTRACT

Blind inserts for use with sandwich panels and methods for manufacturing the same. A blind insert can include a nut arranged in an insert. The insert can include a cavity at an end of the nut. When a screw is screwed into the nut, the screw can enter the cavity and dig into the insert. The interference between the insert and the screw can provide friction that prevents the screw from loosening in a vibrating environment. The blind insert can be made by placing a mandrel into the nut. The mandrel includes a nose that extends past the end of the nut. When the insert is molded around the nut, the mandrel prevents mold material from entering a threaded aperture of the nut and forms the cavity in the insert. The blind insert can also be made by placing a cap that defines the cavity on the end of the nut. The insert can be molded around the cap and the nut.

9 Claims, 11 Drawing Sheets

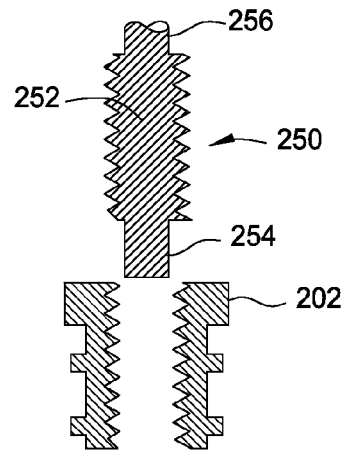 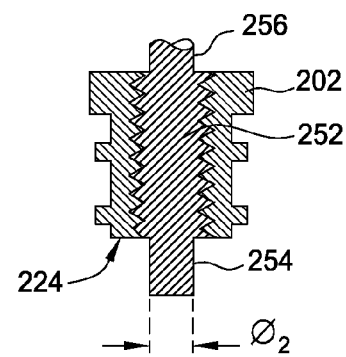
FIG. 4A         FIG. 4B
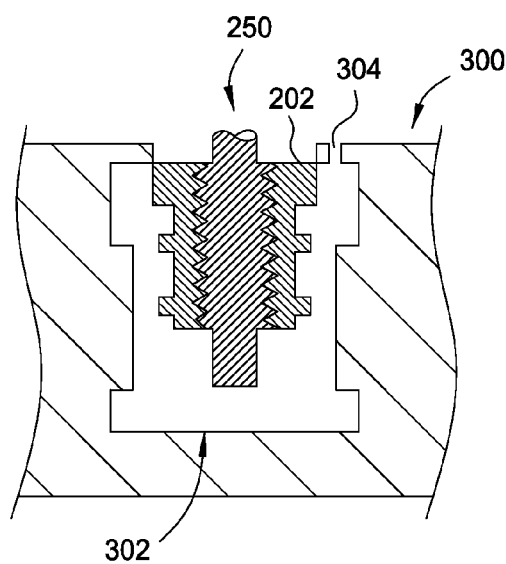 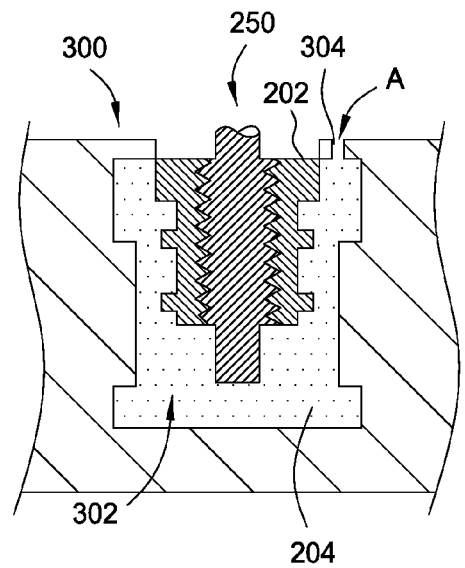
FIG. 4C         FIG. 4D

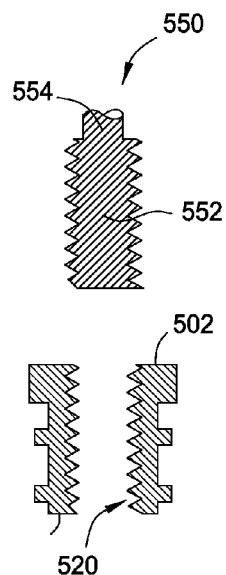
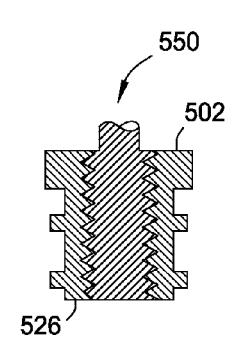
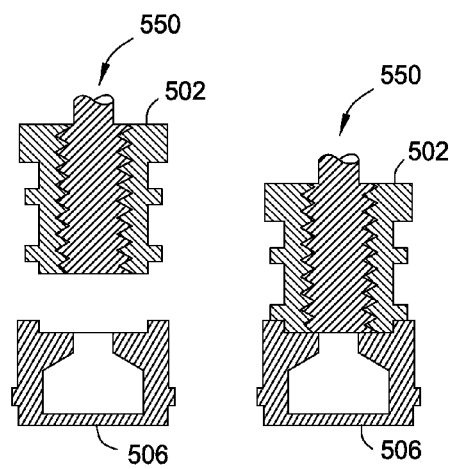
FIG. 7A   FIG. 7B   FIG. 7C   FIG. 7D
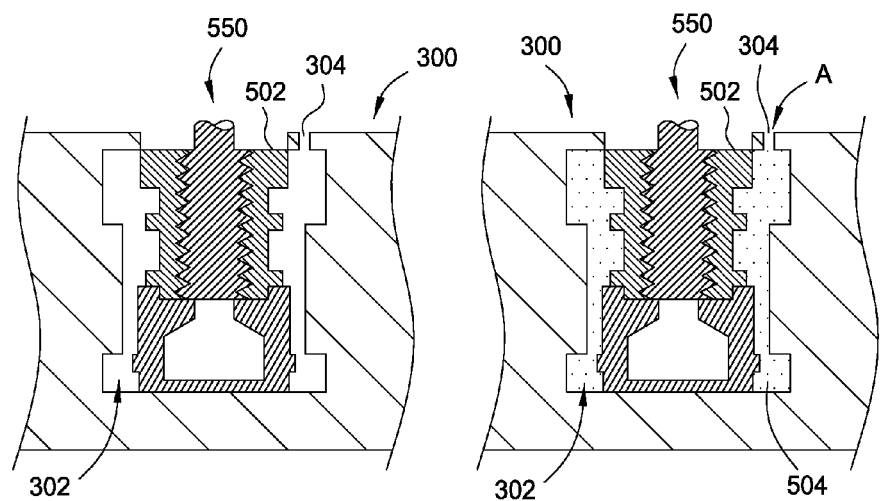
FIG. 7E   FIG. 7F

SELF-LOCKING MOLDED-IN BLIND INSERTS

BACKGROUND INFORMATION

1. Field

Embodiments described herein relate to blind inserts that are typically used with sandwich panels.

2. Background

Sandwich panels are often used to form interior structures, such as walls for bulkheads, galleys, and lavatories, in aircraft. A sandwich panel generally includes two relatively thin outer panels on either side of a honeycomb panel or other lightweight material, such as Styrofoam. A sandwich panel may not have sufficient material strength to handle the stresses caused by a screw that is screwed into the sandwich panel (e.g., to hold a bracket or to connect two walls together). Thus, sandwich panels may employ inserts to decrease stresses caused by screws. A hole can be drilled into a sandwich panel and the insert can be affixed (e.g., with glue or epoxy) into the hole. The insert includes a threaded nut that can receive the screw and a surrounding insert material that increases the area of the panel over which forces transmitted through the screw and transferred to the panel, thereby decreasing stresses.

There are two general types of inserts: through inserts and blind inserts. A through insert extends all of the way through a sandwich panel. By contrast, a blind insert only extends partially through a sandwich panel. With a through insert, a threaded end of a screw threaded into a first side of the insert can be accessible from the second side of the insert. Thus, the threaded end of the screw can be locked to the nut of the insert (e.g., via safety wire) to prevent the screw from loosening due to vibrations. With a blind insert, the threaded end of the screw threaded into a first side of the insert is not accessible from the second side.

To prevent loosening of a screw in a blind insert, the nut of the threaded insert is often crimped after the insert is formed. Passages are formed in the surrounding insert material that enables a crimping tool to reach the nut. The crimping of the nut results in a threaded aperture that is no longer circular. The out-of-round threaded aperture caused increased friction with the screw when the screw is inserted, thereby improving retention of the screw after installation (e.g., in vibrating environments). However, the crimping process adds several steps to the process of manufacturing a blind insert. Furthermore, typical processes have resulted in poor product yield because small variations in crimping can result in a large difference in the amount of friction between the out-of-round threaded aperture of the nut of the insert and the screw. Thus, a high number of produced parts are scrapped because the crimping operation results in too much or too little friction between the threaded aperture of the nut and the screw.

SUMMARY

According to various embodiments, a blind insert can include a nut that has a first end and a second end. The nut can also include a threaded aperture between the first end and the second end. The nut can also define an exterior surface between the first end and the second end. The nut can be configured to receive a screw such that a portion of the screw will extend past the second end when threaded into the first end of the threaded aperture. The blind insert can also include an insert surrounding the exterior surface of the nut. The blind insert can also include a base portion arranged to the second end of the nut and that defines a cavity in communication with the threaded aperture at the second end of the nut. The cavity can be cylindrical and can be coaxial with the threaded aperture of the nut. The cavity can define a dimension that is smaller than a minor diameter of the screw.

According to various embodiments, a method for manufacturing a blind insert can include inserting a mandrel into a threaded aperture of a nut. The nut can include a first end and a second end, and the threaded aperture can extend from the first end to the second end. The mandrel includes a threaded portion configured to engage the threaded aperture and a nose extending from and coaxial with the threaded portion. The nose can define a diameter that is smaller than a minor diameter of the threaded portion of the mandrel. When the mandrel is inserted into the first end of the nut and the threaded portion has engaged the threaded aperture, the nose can extend past the second end of the nut. The nut and mandrel can be arranged in a mold. The mold can define a mold volume. At least the second end of the nut and the nose of the mandrel are within the mold volume. After the nut and mandrel are arranged in the mold, the mold volume can be filled with a molten insert material. Upon the molten insert material solidifying, the nut, the mandrel, and the solidified insert material can be removed from the mold. Then, the mandrel can be separated from the nut and the solidified insert material.

According to various embodiments, a method for manufacturing a blind insert can include arranging a nut relative to a cap or base portion. The nut can include a first end, a second end, and a threaded aperture extending from the first end to the second end. The cap can include a first end, a second end, and a cylindrical cavity formed in the first end of the cap. The cavity can define a dimension that is smaller than a minor diameter of the threaded aperture. The cavity can be in communication with the threaded aperture. The nut and the cap can be arranged in a mold. The mold can define a mold volume, wherein the cap and at least the second end of the nut are within the mold volume. After the nut and cap are arranged in the mold, the mold volume can be filled with molten insert material. Upon the molten insert material solidifying, the nut, the cap, and the solidified insert material can be removed from the mold.

BRIEF DESCRIPTION OF ILLUSTRATIONS

FIGS. 4A-4D are cross-sectional side views illustrating steps in an embodiment of a process for manufacturing the blind insert of FIG. 3;

FIGS. 7A-7F are cross-sectional side views illustrating steps in an embodiment of a process for manufacturing the blind insert of FIG. 6;

DETAILED DESCRIPTION

Figure 1A:
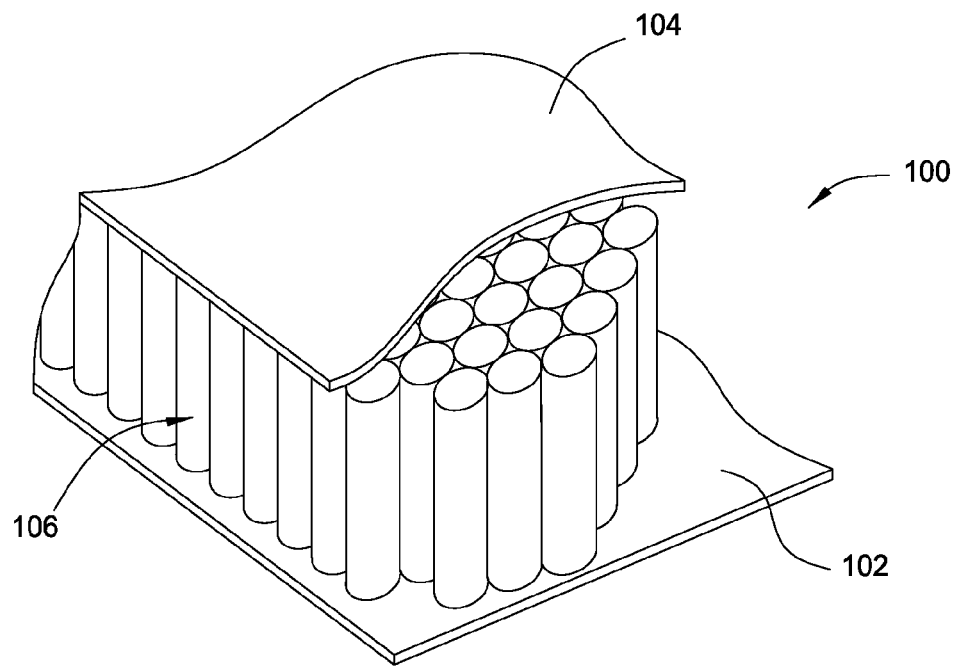
FIG. 1A is a perspective partial cut-away view of a sandwich panel.

With reference now to FIG. 1A, sandwich panels can be used to form interior structures, such as bulkheads, galley walls, and lavatory walls in an aircraft. A sandwich panel (e.g., sandwich panel 100 shown in FIG. 1A) can include outer panels 102 and 104 and a honeycomb material 106 sandwiched there between. In various other configurations, a sandwich panel can include other lightweight materials (e.g., a foamed material, such as Styrofoam) in place of the honeycomb material 106. The panels 102 and 104 can be made of a plastic material, a fiberglass material, or a lightweight metal material, such as aluminum, for example.

In various instances, other sandwich panels, shelves, curtain rods, or the like can be attached to a sandwich panel by brackets. The brackets can be secured to the sandwich panels with screws. However, the screws generally are not applied directly to the sandwich panels because the sandwich panels do not have sufficient strength to overcome stresses that would be applied by the relatively-small screws. Inserts can be applied to the sandwich panel and a screw can be screwed into a nut in each insert. The inserts are larger than the screws and therefore distribute any loads transmitted by the screw over a larger area, thereby lowering stresses on the sandwich panel. Generally, there are two types of inserts: through inserts and blind inserts. Through inserts extend all the way through a sandwich panel such that a screw inserted into the through insert on one side of the panel can pass all of the way through the panel and extend past the other side of the panel. Blind inserts extend only part of the way through a sandwich panel, and a screw inserted into the blind insert from a first side of the panel does not extend past the other side of the panel.

Figure 1B:
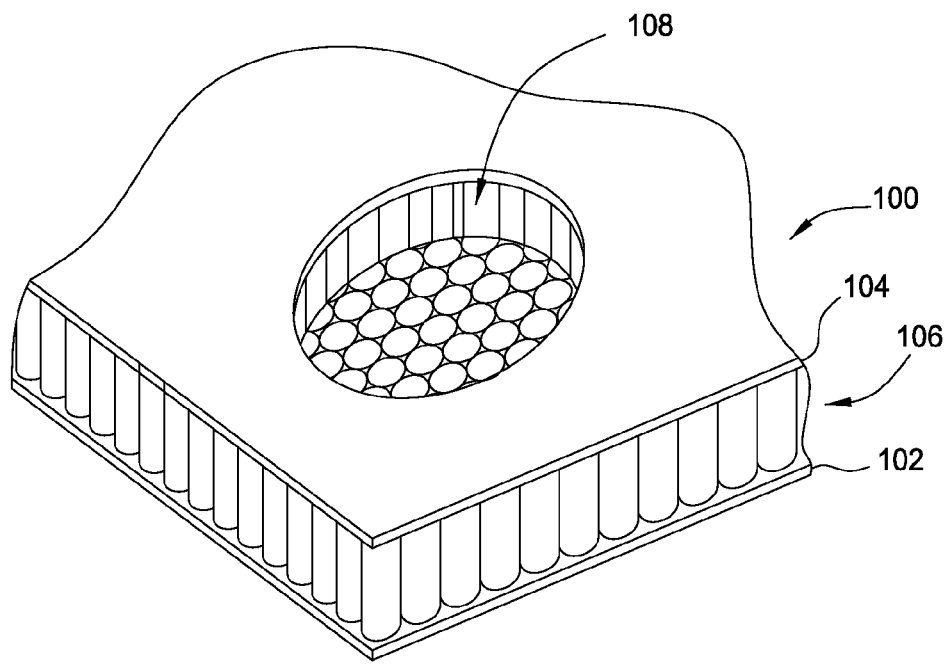
FIG. 1B is a perspective view of the sandwich panel of FIG. 1A with a hole cut partially therein for insertion of a blind insert.

Referring to FIG. 1B, to use a blind insert, a relatively large hole 108 can be formed partially through the sandwich panel 100. For example, as shown in FIG. 1B, a hole 108 can extend through a first panel 104 and partially through the honeycomb layer 106. In the illustrated embodiments, the hole 108 does not extend through the remainder of the honeycomb 106 or the second panel 102. In other embodiments, the hole 108 can extend completely through the honeycomb layer 106 and terminate at the inner surface of the second panel 102.

Figure 2:
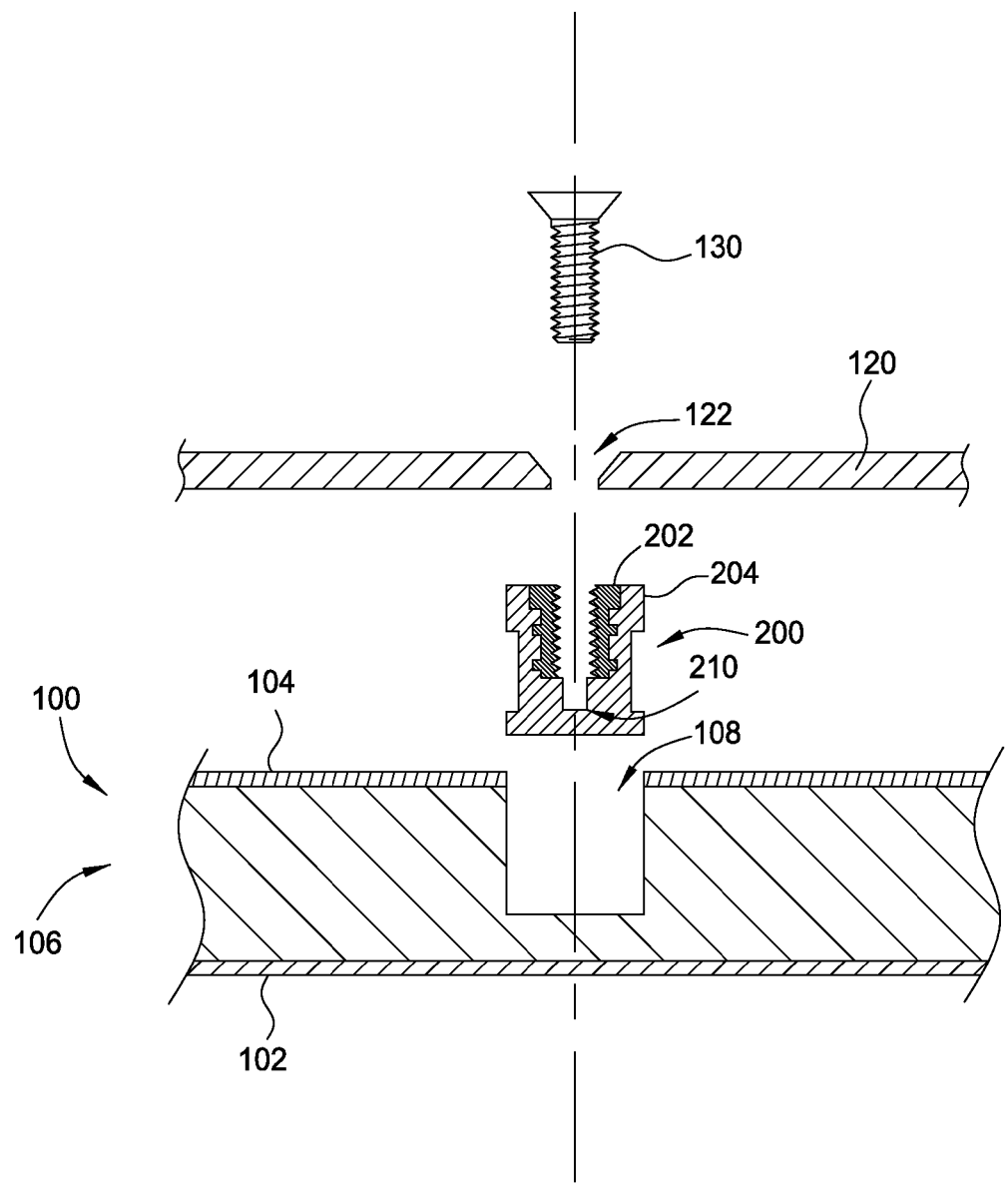
FIG. 2 is an exploded cross-sectional side view of the sandwich panel of FIG. 1B, with an embodiment of a blind insert, a bracket, and a screw arranged relative to the hole in the sandwich panel.

FIG. 2 illustrates a side view of the sandwich panel 100 with the hole 108 therein. An embodiment of a blind insert 200, bracket 120, and screw 130 are arranged in an exploded view. Generally, the blind insert 200 includes a nut 202 and an insert 204 that surrounds the nut 202. In various embodiments, the insert 204 is molded around the nut 202. The blind insert 200 can be inserted into the hole 108. The blind insert 200 can be affixed in the hole 108 in many ways. For example, glue, epoxy, and/or another adhesive can be applied to the hole 108 before the blind insert 200 is inserted therein. As another example, the blind insert 200 can define a diameter that is slightly larger than a diameter defined by the hole 108 such that the blind insert 200 is press fit into the hole 108 and retained in the hole 108 by friction. As another example, the blind insert 200 can include anchoring elements that engage the hole 108. After the blind insert 200 has been inserted into the hole 108 (and after any epoxy and/or adhesive has cured), the bracket 120 can be arranged on the sandwich panel 100 with the hole 122 in the bracket aligned with the nut 202 of the blind insert 200. A screw 130 can be inserted through a hole 122 in the bracket 120 and threaded into the nut 202 of the blind insert 200, thereby affixing the bracket 120 to the sandwich panel 100. In some applications, vibrations may cause the screw 130 to loosen over time. In prior blind inserts, after an insert was molded around a nut, the nut was crimped or pinched such that a threaded aperture through the nut was no longer circular. The out-of-round threaded aperture created by crimping caused increased friction with the screw 130, thereby improving retention of the screw 130. However, the crimping and/or pinching operation can result in significant variability (resulting in widely varying torques being required to insert a screw into the nut) and can also result in significant wastage (e.g., when a particular nut is crimped too much).

Figure 3A:
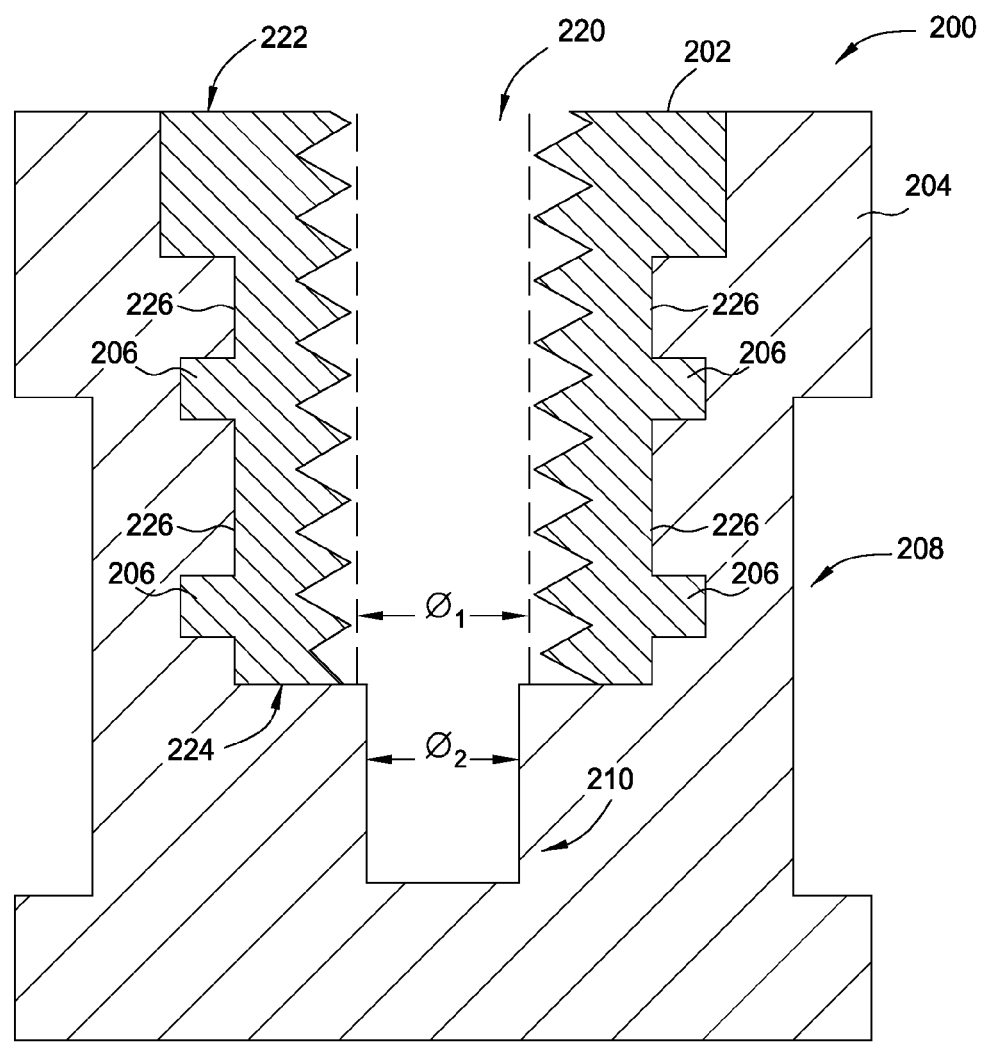
FIG. 3A is a cross-sectional side view of an embodiment of a blind insert.

Embodiments of blind inserts described herein include an insert that purposely interferes with the screw 130 to provide a friction fit that prevents the screw 130 from backing out (e.g., in vibrating environments). FIG. 3A is a detailed cross-sectional view of the embodiment of the blind insert 200 shown in FIG. 2. The nut 202 includes a first end 222, a second end 224, and a threaded aperture 220 extending from the first end 222 to the second end 224. The insert 204 surrounds the side or sides 226 of the nut 202 and also extends below the second end 224 of the nut 202. The nut 202 can include one or more retention features 206 extending from the side or sides 226. For example, the one or more retention features 206 can include posts, ribs, knobs, knurls, surface texturing, and/or the like. The retention features 206 can include continuous annular elements and/or discrete individual features arranged on the exterior sides 226. In various other embodiments, the side or sides 226 of the nut 202 can define a top profile with a polygon shape (e.g., a triangle, a square, a pentagon, a hexagon, etc.). The polygon shape can prevent the nut 202 from rotation relative to the insert 204. The retention features 206 can also prevent the nut 202 from rotating relative to the insert 204 and can also prevent the nut 202 from being pulled out of the insert 204. In various embodiments, the side 226 of the nut 202 can define a circular profile, and the retention features 206 can prevent the nut 202 from rotating relative to the insert 204 and/or from being pulled out of the insert 204. The insert 204 can include one or more retention features on an exterior surface. For example, the insert 204 can include a recess 208 around its perimeter, formed by relatively diametrically enlarged portions at both ends of the insert 204. In various embodiments in which the blind insert 200 is affixed in the hole 108 in the sandwich panel 100 with glue, epoxy, and/or other adhesive, the recess 208 can provide a space for the adhesive to collect and bond to the insert 204 and to the sandwich panel 100.

The insert 204 can include a cylindrical cavity 210 proximate to the second end 224 of the nut 202 and in communication with the threaded aperture 220 of the nut 202. As shown in FIG. 3A, the threads of the threaded aperture 220 can define a first diameter $Ø_1$. This first diameter $Ø_1$ is approximately equal to the minor diameter of the threads of the screw 130. The cylindrical cavity 210 can define a second diameter $Ø_2$ that is smaller than the first diameter $Ø_1$.

Figure 3B:
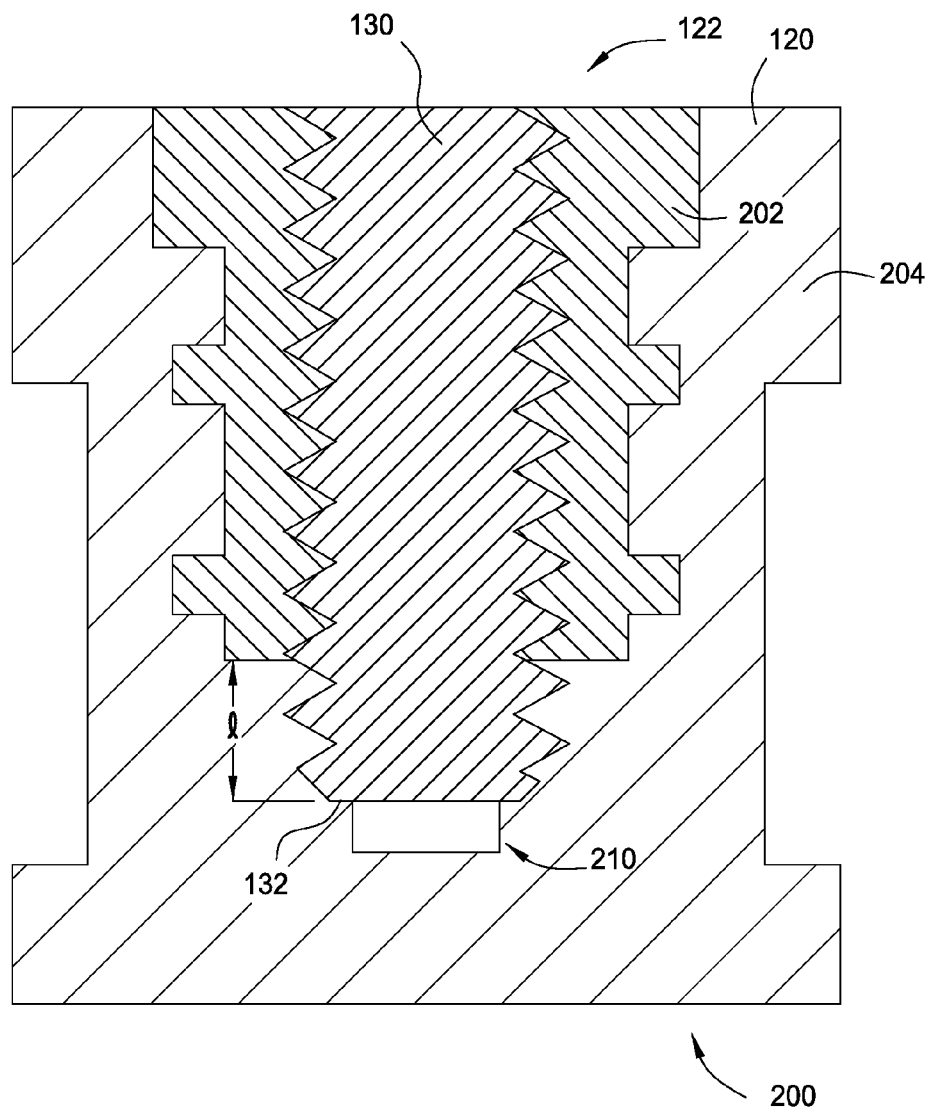
FIG. 3B is a cross-sectional side view of the blind insert of FIG. 3A with a screw inserted therein.

Referring now to FIG. 3B, when the screw 130 is screwed into the threaded aperture 220, the tip of the screw 130 can extend past the second end 224 of the nut 202. The end 132 of the screw 130 can then dig into the walls of the cylindrical cavity 210 (or cause elastic deformation) because the diameter of the end 132 of the screw 130 is larger than the second diameter $Ø_2$. This interference between the end 132 of the screw 130 and the walls of the cylindrical cavity 210 results in friction holding the screw 130 in place, thereby preventing the screw 130 from backing out in a vibrating environment. The end 132 of the screw 130 can advance a length l into the insert material 204 (when the screw 130 is seated in the bracket 120). The friction force between the insert material 204 and the end 132 of the screw 130 may increase (e.g., linearly) as the screw begins to engage the insert material 204 until the end 132 of the screw 130 has advanced the length l.

In various embodiments, the nut 202 can be made of a stainless steel alloy, a titanium alloy, or other suitable metal. In other embodiments, the nut 202 can be made of a plastic material. In various embodiments, the insert 204 can be made of a plastic material, such as nylon, ketene, or phenolic. Carbon fiber or fiber glass strands can be added to the plastic material to make the insert 204 stronger, but such additions can also make the insert 204 more brittle. Where the screw 130 is going to dig into the insert 204, plastic material without such additions may be more suitable. In various embodiments, the insert 204 can be made of a soft metal, such as certain aluminum alloys. The portion of the insert 204 that defines the cavity 210 could also be made of different materials at different positions along the length l (e.g., initially a softer material and then a harder material). In various embodiments, the screw 130 can be made of titanium, a stainless steel alloy, or another suitable metal. In various embodiments, the screw 130 can include cutting threads to cut through the insert material 204.

Figure 5:
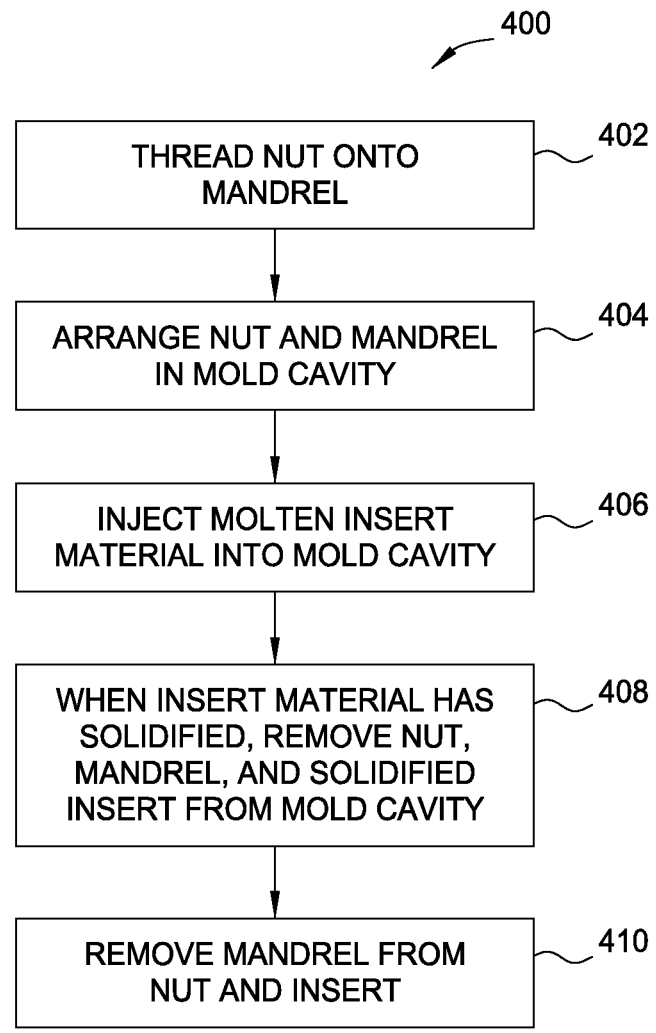
FIG. 5 is a block diagram of the process shown in FIGS. 4A-4D.

FIG. 5 illustrates a method 400 for manufacturing the blind insert 200 shown in FIGS. 3A and 3B. FIG. 5 will be described in conjunction with FIGS. 4A-4D, which are side cross-sectional views of the insert 200 at various stages of manufacturing. In block 402, a nut 202 can be threaded onto a mandrel 250. Referring to FIG. 4A, in various embodiments, the mandrel 250 can be affixed to a support for a molding machine (e.g., held stationary) and the nut 202 can be threaded thereon. In various other embodiments, the mandrel can rotate about a longitudinal axis, such that it can be threaded into the nut 202. As shown in FIG. 4B, when the mandrel 250 is fully threaded into the nut 202, a nose 254 of the mandrel 250 can extend past the second end 224 of the nut 202. In addition, the threaded portion 252 of the mandrel 250 can fill the volume of the threaded aperture 220 of the nut 202. A shaft 256 or the like can connect the threaded portion 252 of the mandrel 250 to a support (e.g., a support of a molding machine). In block 404, the nut and mandrel can be arranged in a mold cavity 302. Referring to FIG. 4C, a mold 300 can include a mold cavity 302 therein. The mold 300 can include one or more fill ports 304 through which molten insert material can be injected into the mold cavity 302. In block 406, after the mandrel 250 and nut 202 are arranged in the mold cavity 302, the mold cavity 302 can be filled with molten insert material 204, as shown in FIG. 4D. In block 408, after the insert material 204 has solidified, the mandrel 250, the nut 202, and the solidified insert material 204 can be removed from the mold cavity 302. Thereafter, in block 410, the mandrel 250 can be removed from the nut and from the solidified insert material 204. The mandrel 250 prevented molten insert material from entering the threaded aperture 220 and also formed the cylindrical cavity 210 in the insert material 204.

Figure 6A:
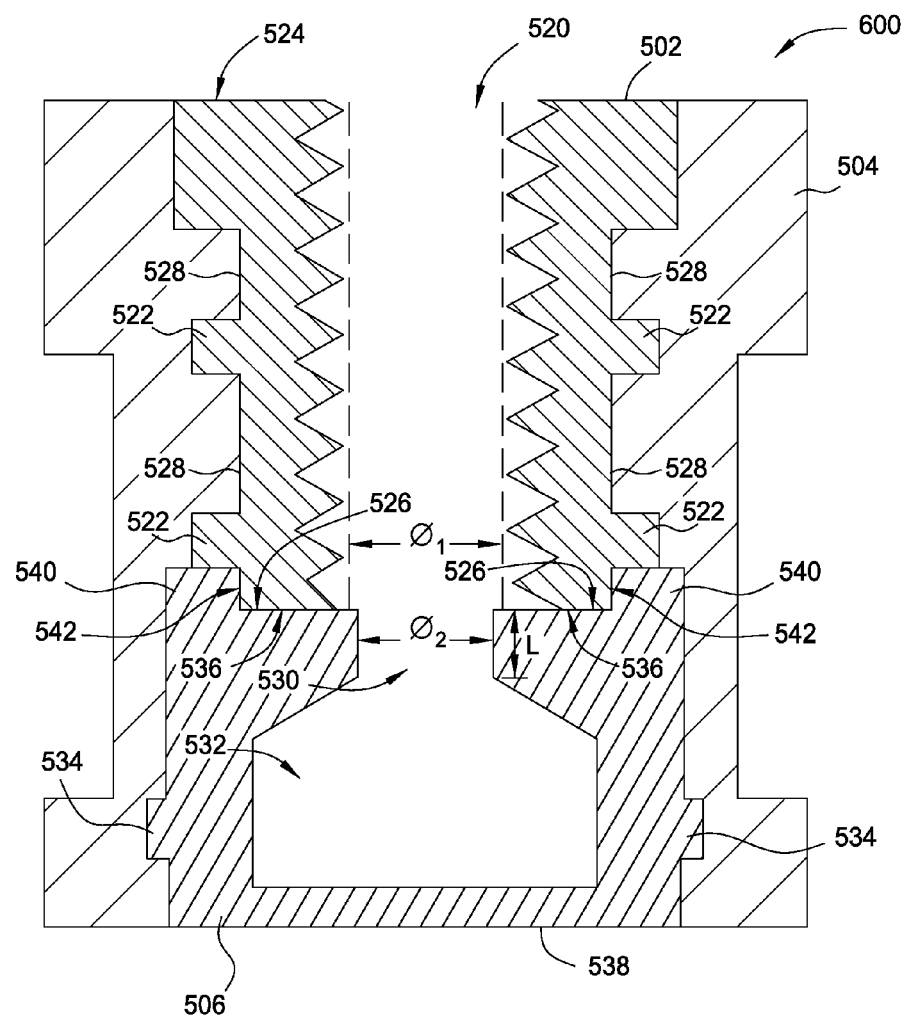
FIG. 6A is a cross-sectional side view of another embodiment of a blind insert.

FIG. 6A illustrates another embodiment of a blind insert 500. Here, the blind insert 500 includes a nut 502 that has a first end 524, a second end 526, and a threaded aperture 520 there between. The blind insert 500 also includes a cap 506 arranged at the second end 526 of the nut 502. The cap 506 can also include a first end 536 and a second and 538. The first end 536 of the cap 506 can engage the second end 526 of the nut 502. The cap 506 and the nut 502 can be surrounded by an insert material 504. As shown in FIG. 6A, in various embodiments, the second end 538 of the cap 506 can be flush with the insert material 504. In various other embodiments, the insert material 504 can extend below the second end 538 of the cap 506, such that the insert material 504 covers the second end 538 of the cap 506. The cap 506 can include retention features 534, and the nut 502 can include retention features 522. As described above, the retention features 522 and 534 can prevent the nut 502 and the cap 506 from rotating and/or moving relative to the insert material 504.

Figure 6B:
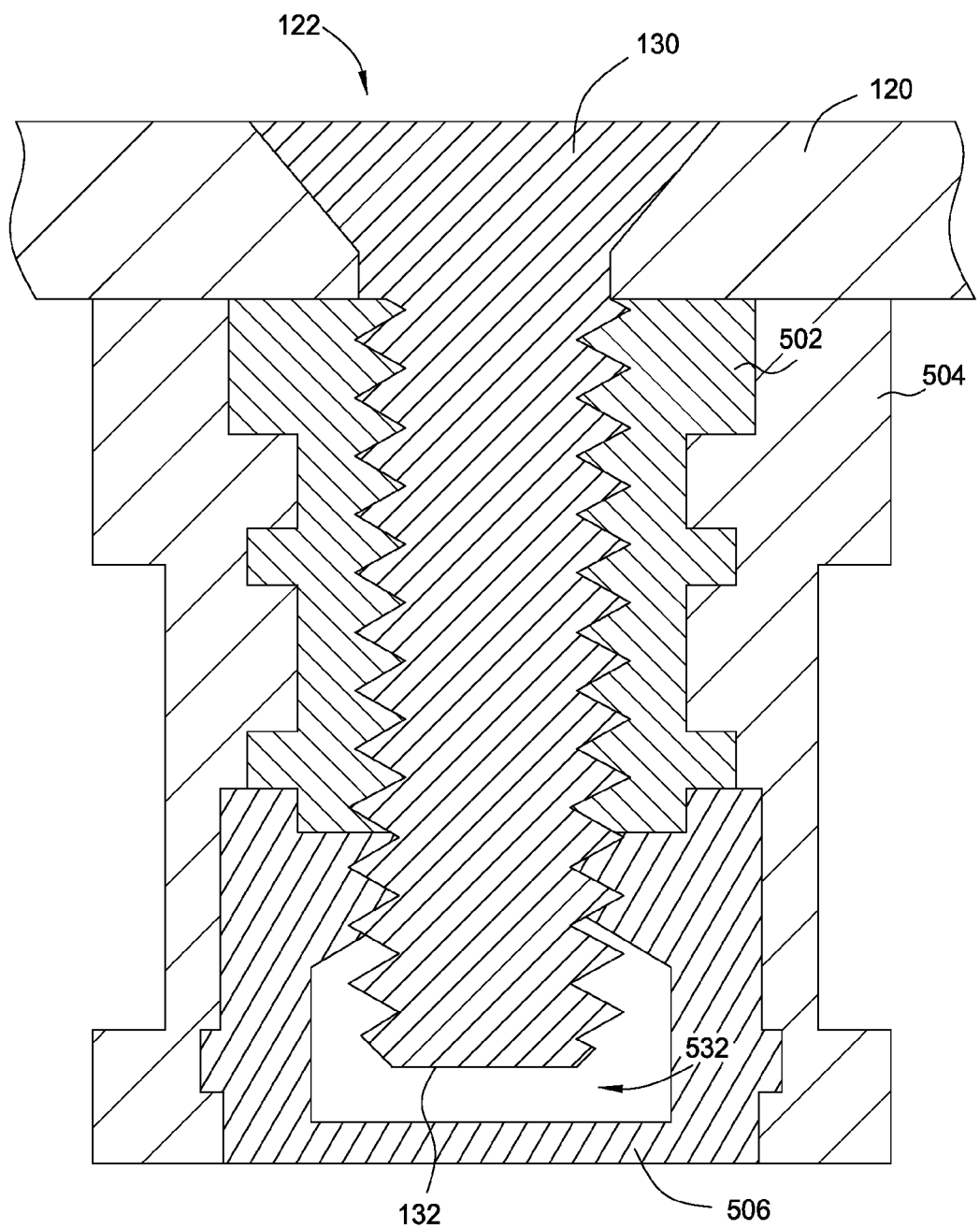
FIG. 6B is a cross-sectional side view of the blind insert of FIG. 6A with a screw inserted therein.

The cap 506 can include a first cylindrical cavity 530 in communication with the threaded aperture 520 of the nut 502. The threads of the threaded aperture 520 can define a first diameter $Ø_1$. This first diameter $Ø_1$ can be approximately equal to the minor diameter of the threads of the screw 130. The cylindrical cavity 530 can define a second diameter $Ø_2$ that is smaller than the first diameter $Ø_1$. Additionally, the cap 506 can include a second cavity 532 that is in communication with the first cylindrical cavity 530. The first cylindrical cavity 530 can be arranged between the threaded aperture 520 and the second cavity 532. The second cavity 532 can include a diameter or diameters that are larger than the second diameter $Ø_2$ of the first cylindrical cavity 530. Referring now to FIG. 6B, when the screw 130 is screwed into the threaded aperture 220, the end 132 of the screw 130 can extend past the second end 526 of the nut 502. The end 132 of the screw 130 can then dig into the wall of the cylindrical cavity 530 because the diameter of the screw 130 is larger than the second diameter $Ø_2$. Similar to the embodiment shown in FIGS. 3A and 3B, this interference between the screw 130 and the walls of the cylindrical cavity 530 can result in friction holding the screw 130 in place, thereby preventing the screw 130 from backing out in a vibrating environment. However, the blind insert 500 in FIGS. 6A and 6B can limit the amount of torque required to screw the screw 130 into the blind insert 500. As described above, in the blind insert 200 shown in FIGS. 3A and 3B, as the screw 130 advances and cuts into the walls of the cylindrical cavity 210, more torque is required to turn the screw 130 to overcome the increasing frictional forces between the walls of the cylindrical cavity 210 and the screw 130. By contrast, in the blind insert 500 shown in FIGS. 6A and 6B, as the screw 130 advances and cuts into the walls of the cylindrical cavity 530, the frictional forces between the cylindrical walls of the cylindrical cavity 530 and the screw 130 will increase until the end 132 of the screw 130 advances into the second cavity 532 in the 506. Once the end 132 of the screw 130 advances into the second cavity 532, the frictional force will remain constant because the end 132 of the screw 130 is no longer cutting into new insert material 504. Furthermore, by setting the length L of the cylindrical cavity 530, a manufacturer of the blind insert 500 can control the amount of torque required to turn and seat the screw 130 (and also the amount of torque required to loosen the screw 130).

Figure 8:
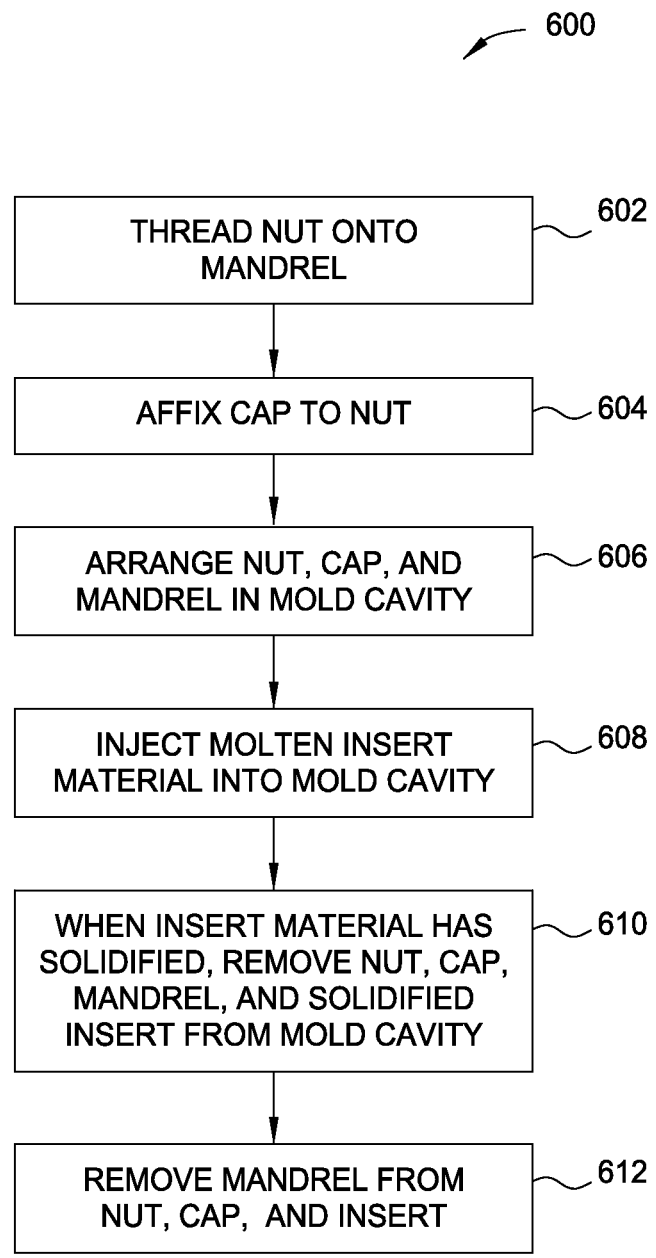
FIG. 8 is a block diagram of the process shown in FIGS. 7A-7F.

FIG. 8 illustrates a method 600 for manufacturing the blind insert 500 shown in FIGS. 6A and 6B. FIG. 8 will be described in conjunction with FIGS. 7A-7F, which show side cross-sectional view of the blind insert 500 at various stages of manufacturing. FIGS. 7A-7F illustrate the method 600 as including a mandrel 550 being inserted into the nut 502 of the blind insert 500. However, in various embodiments, the mandrel 550 can be omitted because the cap 506, engaged with the nut 502, can prevent molten insert material 504 from entering the threaded aperture 520 of the nut 502. In block 602 of the method 600, a nut 502 can be threaded onto a mandrel 550. If a mandrel is used, the mandrel 550 can include a threaded portion 552 and a shaft 554 (or the like) that can attach the threaded portion 552 to a support. The mandrel 550 does not require a nose (e.g., the nose 254 of the mandrel 250 shown in FIGS. 4A-4D) because the mandrel 550 does not form the cavity 530 for the blind insert 500. Thus, as shown in FIG. 7B, when a mandrel 550 is assembled on the nut 502, the threaded portion 552 of the mandrel can be flush with the second end 526 of the nut 502.

In block 604, the cap 506 can be assembled and/or affixed to the nut 502. In various embodiments, the cap 506 can be formed from two separate pieces (e.g., two halves) that are attached together before the cap 506 is affixed to the nut 502. In various embodiments, the first end 536 of the cap 506 can be attached to the second end 526 of the nut 502. For example, glue, epoxy, and/or another adhesive can be placed between the first end 536 of the cap 506 and the second end 526 of the nut 502. As another example, the cap 506 can be press fit (e.g. using an interference fit with the nut 502) and/or snap fit to the nut 502. For example, embodiments of the cap 506 can include a raised ring 540 that surrounds the second end 526 of the nut 502. The raised ring 540 can include an interior surface 542 that can engage an exterior surface 528 of the nut 502. In various embodiments, a diameter of the interior surface 542 of the cap 506 can be slightly smaller than a diameter of the exterior surface 528 of the nut 502 such that when the cap 506 is mated to the nut 502, as shown in FIG. 6, a friction fit between the interior surface 542 of the cap 506 in the exterior surface 528 of the nut 502 holds the cap 506 and the nut 502 together. In various embodiments, the cap 506 can be heated and/or the nut 502 can be cooled prior to placing the cap 506 and the nut 502 together. This heating and/or cooling can temporarily increase the dimensions of the raised ring 540 of the cap 506 relative to the exterior surface 528 of the nut 502 to ease assembly. As the cap 506 cools and/or the nut 502 warms to room temperature, an interference fit between the exterior surface 528 of the nut 502 and the interior surface 542 of the cap 506 can hold the cap 506 and the nut 502 together. In various embodiments, the cap 506 can be formed from two separate pieces (e.g., two halves) that are attached to each other and to the nut 502 at the same time. For example, each piece of the cap 506 can include interior surface features that can interlock with exterior surface features of the nut 502. When the two pieces of the cap 506 are brought together, the interlocking features on the nut 502 and the pieces of the cap can engage. By affixing the two pieces of the cap 506 together, the interlocking features may not disengage, holding the cap 506 relative to the nut 502. FIG. 7D illustrates the cap 506 assembled on the nut 502.

In block 606, the nut 502 and the cap 506 can be arranged in a mold cavity 302. FIG. 7E illustrates the nut 502 and the cap 506 arranged in a mold cavity 302 of a mold 300. The mold 300 can include a fill port 304 through which molten insert material 504 can be injected into the mold cavity 302. In various embodiments, as described above, the nut 502 and the cap 506 can be affixed to one another, prior to being placed in the mold cavity. In various other embodiments, the nut 502 and the cap 506 can be assembled in the mold cavity 302. Put differently, the cap 506 can be placed in the mold cavity 302 first, and then the nut 502 can be assembled on top of the cap 506 thereafter. Gravity and/or a press on top of the mold 300 can hold the cap 506 and the nut 502 together during the subsequent injection molding process. In block 608, molten insert material 504 can be injected into the mold cavity 302. FIG. 7F illustrates the mold cavity 302 filled by the molten insert material 504. In block 610, after the insert material has solidified, the nut 502, cap 506 and solidified insert material 504 can be removed from the mold cavity. Thereafter, if a mandrel 550 was used during the method 600, in block 612, the mandrel 550 is removed from the nut 502.

In various embodiments, the cap 506 can be made from the same material as the insert material 504. In such embodiments, the mass of the cap 506 may prevent the material of the cap 506 from deforming, melting, or the like when the molten insert material 504 is injected into the mold cavity 302. The cap 506 may also be cooled prior to being inserted into the mold cavity 302 such that the cap 506 does not reach a temperature where it may deform, melt, or the like when the molten insert material 504 is injected into the mold cavity 302. In various embodiments, the cap 506 can be made from a different material as the insert material 504. In such embodiments, the cap 506 may be made from a material having a higher melting temperature, then the insert material 504 that is injected into the mold cavity 302.

Figure 9A:
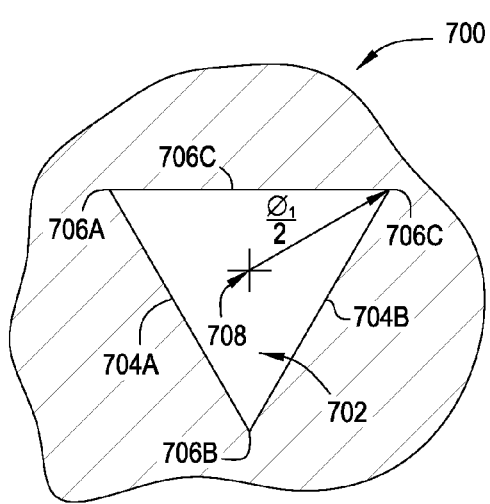
FIGS. 9A-9E illustrate different cross-sectional shapes for embodiments of cavities in a blind insert.

In various embodiments, the cavity (e.g., cavity 210 in FIGS. 3A and 3B and cavity 530 in FIGS. 6A and 6B) may not be cylindrical. FIGS. 9A-9E illustrate cross-sectional shapes for cavities other than cylindrical. FIG. 9A illustrates an embodiment 700 that includes a cavity 702 with a triangular cross section. The cavity 702 can be defined by three sides 704a, 704b, and 704c. By adjusting dimensions of the triangular cross-section of the cavity 702, an amount of interference between the screw 130 and the sides 704a, 704b, and 704c can be controlled. Put differently, the screw 130 will interfere less with the sides 704a, 704b, and 704c of a larger triangular cavity than a smaller triangular cavity. For example, a distance from a centroid 708 of the cavity 702 to an outer dimension of the cavity can be equal to half of the first diameter $Ø_1/2$ of the threaded aperture. For example, if a distance from the centroid 708 to an apex 706a, 706b, or 706c of the triangular cavity 702 is equal to $Ø_1/2$, then a distance from the centroid 708 to any portion of the sides 704a, 704b, and 704c is less than half of the first diameter $Ø_1/2$. Thus, when the screw 130 is inserted into the blind insert, the portion of the screw 130 extending into the triangular cavity 702 can interfere with all portions of the sides 704a, 704b, and 704c of the cavity 702. By comparison, if a distance from the centroid 708 to a middle portion (e.g., equidistant between apexes 706a and 706b) of a side (e.g., side 704a) is equal to half of the first diameter $Ø_1/2$ of the threaded aperture, then portions of the sides 704a, 704b, and 704c proximate to the apexes 706a, 706b, and 706c may not interfere with the screw 130.

Figure 9B:
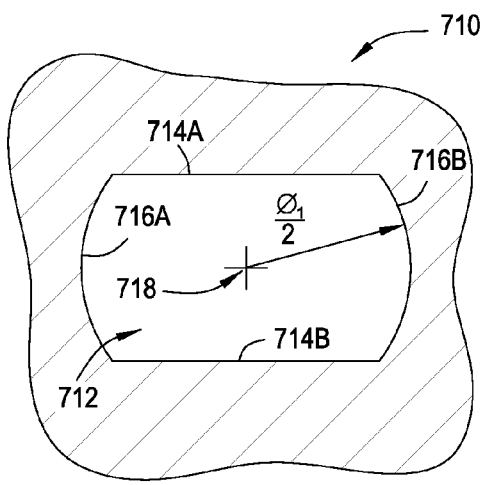

FIG. 9B illustrates an embodiment 710 that includes a cavity 712 with a keyhole-shaped cross section. The cavity 712 can be defined by two substantially parallel and straight sides 714a and 714 and two curvilinear arc-shaped sides 716a and 716b. A distance from a centroid 718 of the cavity 712 to one of the arc-shaped sides 716a and 716b can be equal to half of the first diameter $Ø_1/2$ of the threaded aperture. A distance from the centroid 718 to the substantially straight sides 714a and 714b can be less than or greater than the half of the first diameter $Ø_1/2$ of the threaded aperture to control the amount of interference with the screw 130. By changing the distance between the parallel sides 714a and 714b, the amount of interference between the screw 130 and the sides 714a and 714b can be adjusted.

Figure 9C:
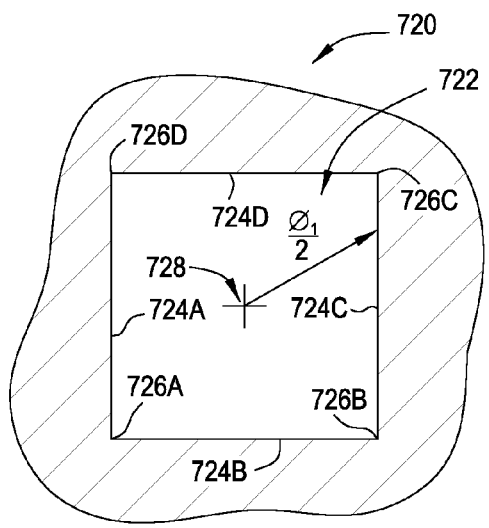

FIG. 9C illustrates an embodiment 720 that includes a cavity 722 with a square cross section. The cavity 722 can be defined by four sides 724a, 724b, 724c, and 724d. A distance from a centroid 728 of the cavity to a position on one of the sides 724a, 724b, 724c, and 724d can be equal to half of the first diameter $Ø_1/2$ of the threaded aperture. For example, if a distance from the centroid 728 to a corner 726a, 726b, 726c, or 726d is equal to half of the first diameter $Ø_1/2$ of the threaded aperture, then a screw 130 inserted into the cavity 722 should engage all four sides 724a, 724b, 724c, and 724d of the cavity 722 up to and including the corners 726a, 726b, 726c, and 726d. As another example, if a distance from the centroid 728 to a point on a side (e.g., side 726a) that is equidistant between bordering corners (e.g., corners 726a and 726d border side 726a), then a screw 130 inserted into the cavity 722 may only engage central portions of each of the sides 724a, 724b, 724c, and 724d. Put differently, the screw 130 will not engage the sides 724a, 724b, 724c, and 724d proximate to the corners 726a, 726b, 726c, and 726d.

Figure 9D:
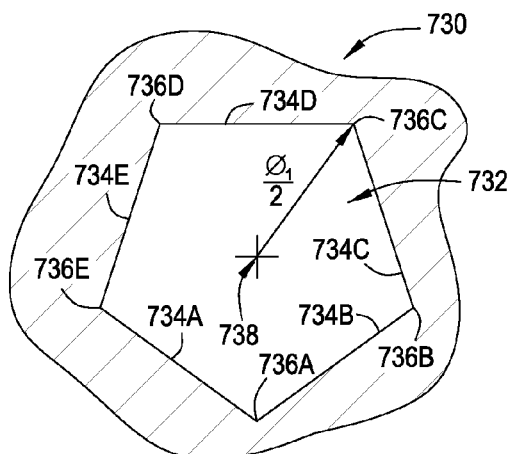

FIG. 9D illustrates an embodiment 730 that includes a cavity 732 with a pentagon cross section. The cavity 732 can be defined by five sides 734a, 734b, 734c, 734d, and 734e. A distance from a centroid 738 of the cavity to a position on one of the sides 734a, 734b, 734c, 734d, and 734e can be equal to half of the first diameter $Ø_1/2$ of the threaded aperture. Similar to the square cross-section cavity 722 shown in FIG. 9C, the distance can be set between the centroid 738 and a corner 736a, 736b, 736c, 736d, or 736e or can be set at a point along a side 734a, 734b, 734c, 734d, or 734e, thereby changing how much a screw 130 will interfere with the sides 734a, 734b, 734c, 734d, and 734e of the cavity 732. A cavity can comprise a cross sectional shape of a polygon with other numbers of sides (e.g., a hexagon or an octagon).

Figure 9E:
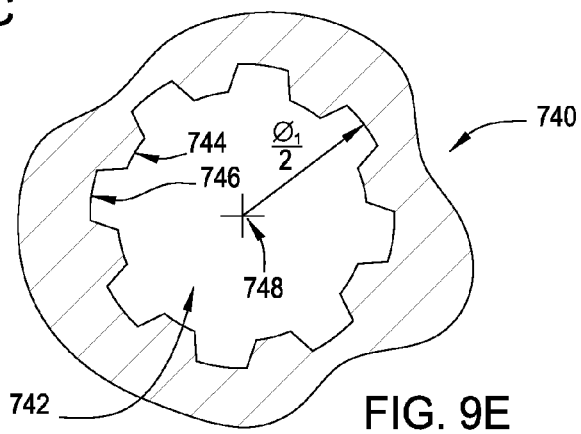

FIG. 9E illustrates an embodiment 740 that includes a cavity 742 that defines splines 744 along a wall 746. The wall 746 can be cylindrical and can include a plurality of longitudinally arranged splines 744 extending inwardly toward a centroid 748 of the cavity 742. A distance between the centroid 748 and the wall 746 of the cavity 742 can be equal to half of the first diameter $Ø_1/2$ of the threaded aperture. Consequently, a screw 130 will interfere with the material of the splines 744. By controlling the number of splines 744 and/or the amount by which the splines 744 extend toward the centroid 748, the amount of interference between the screw 130 and the splines 744 can be controlled.

The descriptions of various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The flowchart and block diagrams in the Figures illustrate operation of possible implementations of methods according to various embodiments. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

While the foregoing is directed to various embodiments, other and further embodiments may be devised without departing from the basic scope thereof, and the scope thereof is determined by the claims that follow.

What is claimed is:
1. A blind insert, comprising:
a nut that includes a first end and a second end, wherein the nut defines a threaded aperture between the first end and the second end, wherein the nut defines an exterior surface between the first end and the second end;
an insert surrounding the exterior surface of the nut; and
a base portion arranged adjacent to the second end of the nut, wherein the base portion defines a screw tip-receiving cavity in communication with the threaded aperture at the second end of the nut, and wherein the cavity defines a dimension that is smaller than a minor diameter of a screw that is threadable into the threaded aperture.

2. The blind insert of claim 1, wherein the cavity is cylindrical, and wherein a diameter of the cavity is less than the minor diameter of the screw that is threadable into the threaded aperture.

3. The blind insert of claim 1, wherein the insert and the base are monolithic.

4. The blind insert of claim 1, wherein the base portion is separately formed from the insert, wherein the base portion defines an exterior surface, and wherein the insert at least partially surrounds the exterior surface of the base portion.

5. The blind insert of claim 4, further comprising a second cavity in communication with the cavity, wherein the cavity is arranged between the threaded aperture at the second end of the nut and the second cavity, and wherein the second cavity defines a dimension that is larger than the dimension of the cavity.

6. The blind insert of claim 1, further comprising a screw that is threadable into the threaded aperture of the nut, wherein at least a tip of the screw extends past the second end of the nut when threaded into the first end of the threaded aperture, and wherein the tip of the screw engages sides of the screw tip-receiving cavity when threaded into the threaded aperture.

7. The blind insert of claim 1, wherein the cavity defines a polygonal cross-sectional shape, and wherein a distance from a centroid of the polygonal cross-sectional shape to a point on a wall of the cavity is less than the minor diameter of the screw that is threadable into the threaded aperture.

8. The blind insert of claim 1, wherein the cavity comprises a cylinder that includes inwardly-extending longitudinal splines, and wherein a diameter defined by the splines is less than the minor diameter of the screw that is threadable into the threaded aperture.

9. The blind insert of claim 1, further comprising:
a sandwich panel with a hole drilled partially therethrough, wherein the blind insert is affixed in the hole of the sandwich panel.

* * * * *